May 8, 1945.    P. M. KIRK    2,375,563
PREPARATION OF ESTERS OF ACONITIC ACID
Filed April 2, 1942
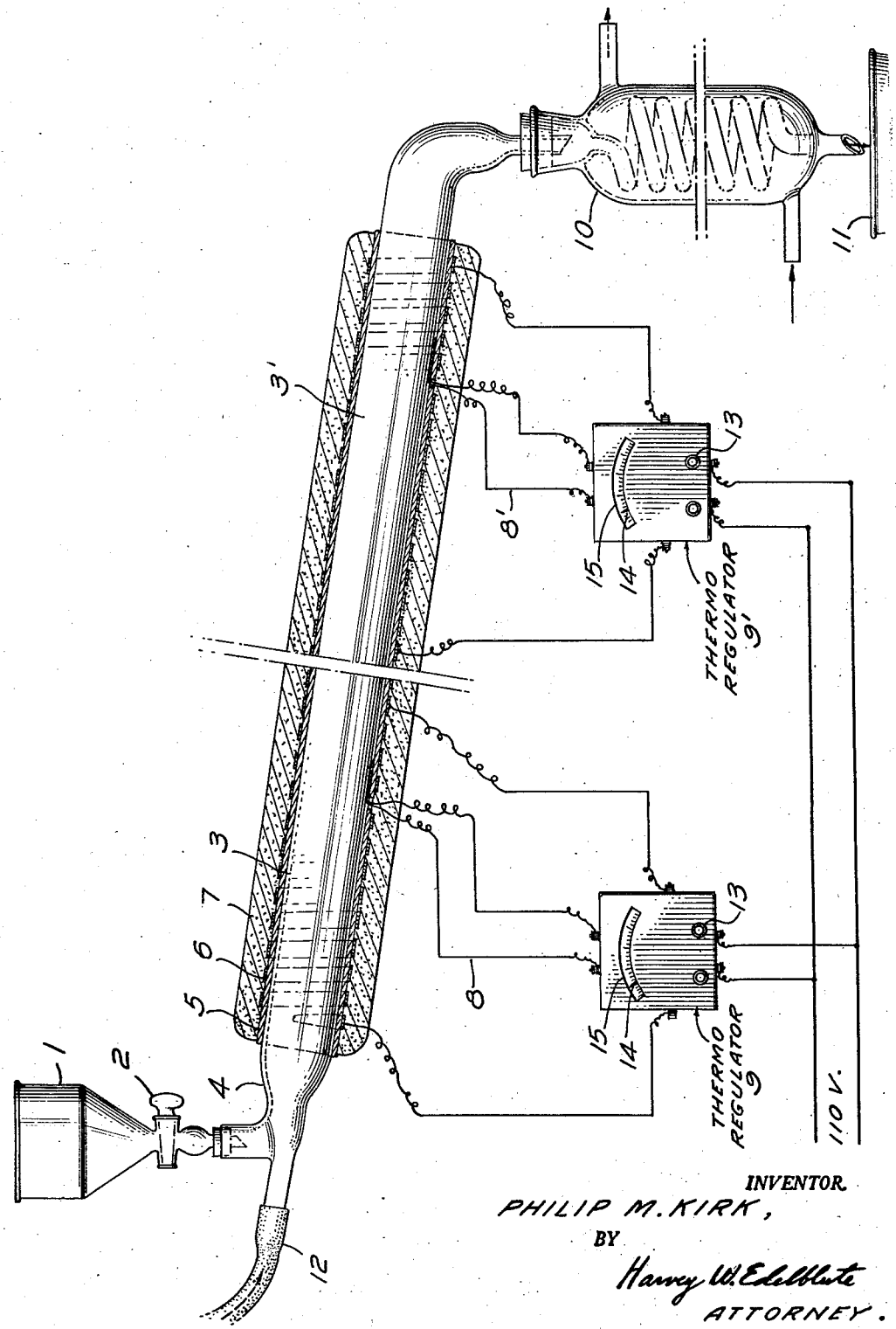
INVENTOR.
PHILIP M. KIRK,
BY
Harry W. Edelblute
ATTORNEY.

Patented May 8, 1945

2,375,563

UNITED STATES PATENT OFFICE 2,375,563

PREPARATION OF ESTERS OF ACONITIC ACID

Philip M. Kirk, Stamford, Conn., assignor to American Cyanamid Company, New York, N. Y., a corporation of Maine Application April 2, 1942, Serial No. 437,380

2 Claims. (Cl. 260—485)

This invention relates to an improved method of preparing esters of aconitic acid.

Although esters of aconitic acid have been known for many years they have been for the most part little more than laboratory curiosities. In recent years however they have become of considerable commercial importance and in great demand because of their uses as plasticizers for synthetic rubber and as intermediates in the preparation of surface active agents. Demands for aconitic esters have therefore exceeded the supply and heretofore known methods of preparing the esters are inadequate to supply the required amounts at reasonable prices.

Aconitic acid esters which have the general formula

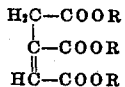

may theoretically be prepared by simple dehydration of citric acid esters

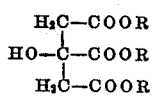

Although many attempts have been made in the laboratory to prepare aconitic acid esters by simple dehydration of the corresponding citric acid esters by merely heating, and by the action of hydrochloric acid and sulfuric acid, such attempts have yielded an impure product in low yields because of side reactions which occur during the reaction. These side reactions involve hydrolysis of the ester, formation of the anhydride, decomposition of the product with the formation of $CO_2$ and itaconic anhydride followed by partial rearrangement of the latter to citraconic anhydride and the like. Principally for these reasons the commercial utilization of such methods has been impractical.

It has also been suggested to prepare aconitic acid esters by acetylating citric acid esters with acetyl chloride, driving off the resulting HCl which forms during the reaction and thereupon deacetylating the product in accordance with the following reactions:

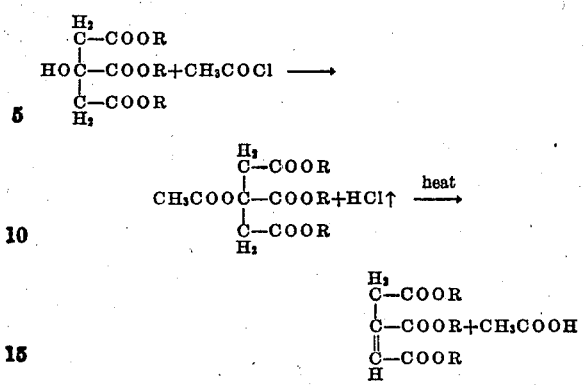

It will be noted that both hydrochloric acid and acetic acid vapors are given off during the course of this reaction. As is well known, hydrochloric acid vapors are exceedingly corrosive and the reaction must be handled in equipment made from glass, quartz or similar acid resistant, nonmetallic material. The equipment available for such processes is therefore limited in size, expensive to install and easily damaged. Also, HCl not being condensible at ordinary pressures must be absorbed in water requiring still more elaborate equipment. Even so the escape of HCl fumes causes corrosion of adjacent equipment and creates a nuisance to the workmen in the plant. The process has the further disadvantage of requiring acetyl chloride which is relatively expensive and difficult to handle and which can not be recovered as such for reuse in the process. The acetic acid liberated by the deacetylation of acetylated citric acid esters may be recovered by distillation and condensation but being usually contaminated with HCl must be thrown away or treated to make it suitable for use in other processes.

Although acetic anhydride is generally recognized as being a much weaker acetylating agent than acetyl chloride, I have found that esters of aconitic acid can be prepared from esters of citric acid by heating the same with acetic anhydride in the presence of an acetylation catalyst. The use of acetic anhydride in accordance with my invention results in a number of important advantages which make the commercial manufacture of aconitic acid esters from citric acid esters commercially feasible. Acetic anhydride is a material of comparatively low cost, easily obtainable and easily handled. The principal advantage of my process, however, arises from the fact that no corrosive HCl acid vapors are evolved during the process. This fact gives me a much wider choice of materials for plant construction having lower cost and greater mechanical strength and available in sizes suitable for commercial production.

My invention also has the further advantage of simplicity of operation. In my reaction, acetic acid is liberated during the acetylation stage and also during the deacetylation stage and since the only products resulting from the reaction are acetic acid and the aconitic acid ester, there is no necessity of providing separate means of recovering HCl vapors. Since acetic acid is readily condensed, its recovery may be accomplished by simply allowing its vapors to pass through a water cooled condenser of conventional design. Also, whatever acetic acid may be found in the product can be removed by simple distillation under reduced pressures. Acetic acid having been recovered can be easily dehydrated by known methods and reemployed in the process without waste.

From the foregoing, it will be seen that my improved process consists essentially in heating a desired ester of citric acid with a molecular equivalent, or a slight excess, of acetic anhydride in the presence of an acetylation catalyst. The first stages of the reaction, i. e., the acetylation of the citric acid ester, may be carried out at relatively low temperatures within the range of 150° to 250° C. The time required for the acetylation varies somewhat with the catalyst employed but in general requires from about 5 minutes to one hour at the reflux temperature of the mixture. With more active acetylation catalysts such as sulfuric acid, the acetylation proceeds spontaneously and it may be desirable to cool the mixture to avoid thermal-decomposition. Conventional acetylation catalysts such as phosphoric acid, sulfuric acid, hydrochloric acid, para-toluene sulfonic acid and others known to those skilled in the art may be employed.

During the acetylation of the citric acid ester one molecular equivalent of acetic acid is liberated with the formation of each mol of the acetylated ester. This liberated acetic acid may be removed as it is formed, as shown in Example 6. It may also be removed as a separate step following acetylation, as in Example 3 or it may be removed later in the process as shown in other examples.

The next step of my process is the deacetylation of the acetylated citric acid ester. Deacetylation is accomplished at higher temperatures usually ranging from 250° C. to 450° C. The time required for this step depends on the temperature and also on other conditions affecting the removal of acetic acid from the reaction mixture. The deacetylation results in the formation of the corresponding aconitic acid ester and an equimolecular proportion of acetic acid. As will appear in detail hereinafter, the acetic acid may be condensed and recovered for reuse in the process. Although I ordinarily condense the acetic acid formed in the reaction and collect it with the product, later separating the two by distillation at reduced pressures, it is apparent that the vapors of acetic acid which form at the high temperatures in the pyrolysis chamber may be swept out of the reaction zone away from the liquid ester product and condensed separately.

In so far as I am aware any ester of citric acid and a saturated or unsaturated, primary or secondary, mono, di or polyhydric, aliphatic, aromatic, hydroaromatic or heterocyclic alcohol may be employed in my process to form the corresponding ester of aconitic acid. Among such alcohols which can be esterified with citric acid and be employed in my process include those esters of alcohols such as N-butyl, isoamyl methyl amyl carbinol, diisopropyl carbinol, 2-methyl pentanol, 2,4-dimethyl pentanol-1, 2,4-dimethyl hexanol-3, 4-methyl hexanol-1, 4-methyl heptanol-1, N-hexyl, 2-ethyl hexanol-1, octyl, lauryl, myristyl, stearyl, cetyl, benzyl, phenyl methyl carbinol, cinnamyl, phenyl isopropyl, phenyl dimethyl carbinol, tetrahydro furfuryl, beta-pyridyl carbinol and many others.

One of the most important features of my process is the fact that it can be made to operate substantially continuously. This is made possible by the fact that only acetic acid and the desired ester are obtained as a result of the reactions and these materials are easily collected and separated from each other. The simplicity of the operation enables me to produce the esters in relatively large quantities with surprisingly high yields by merely passing the reaction mixture containing a suitable catalyst through a heated reaction zone. Apparatus for carrying out this continuous production of aconitic acid esters will now be described in connection with the drawing.

In the drawing the single figure is an elevational view, with parts cut away, showing apparatus suitable for carrying out my invention in its preferred embodiment. In this figure a reservoir 1 is provided for the purpose of holding the reaction mixture which will be described in greater detail in the following specific examples. A valve 2 is provided to regulate the flow of the reaction mixture into the reaction zone 3. The reaction zone is formed by a tube 4 of glass, quartz, aluminum, silver, 18-8 molybdenum steel or other material resistant to acetic acid and its vapors at the temperatures prevailing therein. The tube is inclined at a small angle to the horizontal plane somewhat as shown so that the material passing through will flow by gravity but remain in the tube for a sufficient time to be converted to the aconitic ester. Surrounding tube 4 is a heating means which in the apparatus shown consists of an "Alundun" tube 5 wound with "Nichrome" resistance wire 6. Insulation of suitable type 7 surrounds the heating element conserving the heat and tending to make the temperatures in the reaction zone more uniform. Maintenance of appropriate reaction temperatures is secured by means of thermocouples 8, 8' operating in conjunction with thermo-regulators 9, 9' which control the application of current to the heating elements as shown. Thermo-regulators of this type are well known and further description thereof appears to be unnecessary.

At the discharge end of the reaction zone a condenser 10 of conventional design may be provided to condense the acetic acid vapors developed in the reaction zone. Any suitable vessel 11 is provided to receive the crude product. To reduce the tendency of the product to oxidize or thermally decompose an inert gas such as nitrogen may be supplied from a tank (not shown) through tube 12 into the reaction zone.

A slow current of the gas has the effect of sweeping out the acetic acid vapors as they develop into the condenser 10.

Obvious modifications of this apparatus may of course be employed as will be apparent from the description given in conjunction with the following specific examples. The reaction zones 3, 3' may be maintained at the same temperature or, in one preferred embodiment of my invention, at different temperatures, for example, zone 3 may be held at a temperature within the range of 150°–250° C. and zone 3' at temperatures ranging from about 250 to 450° C. in one particular modification of my process. Maintenance of these separate reaction temperatures is simply accomplished by setting control 13 of the thermo-regulator to the desired temperature range as indicated by pointer 14 on scale 15. The apparatus may be further modified by passing the inert gas through the apparatus in a direction countercurrent to the flow of the reaction mixture, thus sweeping out most of the acetic acid vapors and allowing them to be recovered by condensation separately from the reaction product. Also in larger scale production a pumping device regulating the amount of reaction mixture passing through the reaction zone could be employed to advantage in place of the reservoir and regulating valve shown.

The preparation of esters of aconitic acid from esters of citric acid in accordance with my improved process will now be illustrated in conjunction with the following specific examples which, however, are given by way of illustration and not of limitation. Obvious modifications of these procedures will of course occur to those skilled in the art and my invention is to be limited only by the scope of the appended claims.

*Example 1*

180 g. (0.5 mole) of tributyl citrate, 65 g. (0.6 mole) of 95% acetic anhydride and 5 drops of 85% phosphoric acid were mixed and placed in the reservoir designated as 1 in the drawing. A stream of nitrogen gas from a cylinder was then allowed to pass at the rate of 2 c. c. per minute through tube 12 and on through the apparatus. The thermo-regulators 9, 9' were then adjusted so that the temperature of the reaction zone as indicated by thermocouples 8, 8' was about 425° C. Valve 2 was then opened slightly and the reaction mixture allowed to pass slowly through tube 4, which required about 3 hours. The condensate recovered in vessel 11 was then heated under a reduced pressure of 10 mm. of mercury to remove excessive acetic anhydride and the acetic acid produced by the reaction. The final product, tributyl aconitate, was a syrupy liquid of dark amber color having a refractive index of $n_D^{26.5}=1.4555$. A yield of 81% was obtained by this preparation.

*Example 2*

180 g. (0.5 mole) of tributyl citrate, 65 g. (0.6 mole) of 95% acetic anhydride and 5 drops of 85% phosphoric acid were mixed and heated under a reflux condenser for 1 hour at 154–155° C. to effect acetylation of citric acid ester. The crude acetylation mixture was then placed in reservoir 1 and passed through the pyrolysis tube at 425° C. as in Example 1. The product was then heated under reduced pressure to remove the acetic acid. An amber colored product representing a 91% yield of tributyl aconitate was obtained.

*Example 3*

180 g. (0.5 mole) of tributyl citrate, 65 g. (0.6 mole) of 95% acetic anhydride and 5 drops of 85% phosphoric acid were mixed and heated under a reflux condenser for 1 hour at 154–155° C. The reflux condenser was then replaced with a still head and 42 g. of acetic acid, which formed during the acetylation, was removed from the reaction mixture. The crude product was then placed in reservoir 1 and passed through the apparatus as previously described. The product was again distilled under reduced pressure to remove an additional 30 g. of acetic acid. A yield of 94% tributyl aconitate was obtained from this run.

*Example 4*

180 g. tributyl citrate, 65 g. acetic anhydride and 5 drops of concentrated sulfuric acid were mixed and placed in the reservoir. The acetylation of the tributyl citrate proceeded smoothly without heating, in fact, occasional cooling of the reaction mixture was necessary to hold the temperature below 40° C. The crude acetyl derivative was then passed through the pyrolysis tube at 425° C., the product recovered and acetic acid removed as previously described. The product was a very dark amber color probably due to the greater destructive action of the sulfuric acid acetylation catalyst. The yield, however, was 93.5% of the theoretical.

*Example 5*

In this run the reaction tube 4 was packed with pea-size pumice chips and its temperature set at 300° C. 201 g. (0.5 mole) of triamyl citrate, 65 g. (0.6 mole) of 95% acetic anhydride and 2 drops of 85% phosphoric acid were mixed, placed in reservoir 1 and passed through the reaction tube within a period of 3 hours. The excess acetic anhydride and the acetic acid produced by the reaction were removed from the product by distillation at 10 mm. pressure. A dark amber colored product representing a yield of about 84% triamyl aconitate was obtained.

In another run the pumice chips were treated with phosphoric acid catalyst and the catalyst omitted from the reaction mixture. Although triamyl aconitate was obtained in satisfactory yields, it was concluded that the pumice packing in the pyrolysis tube had the effect of retarding the passage of the product through the tube and thereby increased its decomposition by heat. However, the packing had the advantage of allowing a lower reaction temperature to be employed in the reaction zone.

*Example 6*

402 g. (1 mole) triamyl citrate, 130 g. (1.2 mole) acetic anhydride (95%), and 3 drops of 85% phosphoric acid were mixed and heated in a reaction vessel fitted with a short reflux column topped with a still head. Heat for the reaction was supplied by a molten Wood's metal bath. All vapors produced were permitted to distill out. The reaction conditions were as noted in the following table:

| Time, minutes | Temperature, °C. | | Comments |
| --- | --- | --- | --- |
| | Charge | Distilling | |
| | 25 | | Started heating. |
| 15 | 155 | 120 | Started distilling. |
| 45 | 250 | 120 | |
| 60 | 280 | 118 | Reduced pressure. |
| 65 | 280 | Below 118 | Stopped. |

The product remaining in the reaction vessel was cooled and treated with charcoal at 100–120° C. and filtered. An amber colored product, triamyl aconitate, having an index of refraction of $$n_D^{25} = 1.4545$$

was obtained in a 91% yield. Although this procedure does not employ the apparatus illustrated it is particularly advantageous in the preparation of small quantities of aconitic acid esters.

What I claim is:

1. A method of preparing esters of aconitic acid by a substantially continuous process which comprises passing a mixture of an ester of citric acid, acetic anhydride and an acetylation catalyst through a reaction zone maintained at temperatures within the range 150–250° C. to effect acetylation of the citric acid ester and then passing the product through a reaction zone maintained at a temperature within the range 250–450° C. to effect a deacetylation of the said acetylated citric acid ester, thereby producing an aconitic acid ester together with gaseous acetic acid, and condensing said acetic acid by cooling the vapors thereof.

2. A method of preparing alkyl esters of aconitic acid by a substantially continuous process which comprises passing a mixture of an alkyl ester of citric acid, acetic anhydride and an acetylation catalyst through a reaction zone maintained at temperatures within the range 150–250° C. to effect an acetylation of the citric acid ester and then passing the product through a reaction zone maintained at a temperature within the range 250–450° C. to effect a deacetylation of the said acetylated citric acid ester, thereby producing an aconitic acid ester together with gaseous acetic acid, and condensing said acetic acid by cooling the vapors thereof.

PHILIP M. KIRK.